United States Patent
Maeda et al.

[11] Patent Number: 6,072,465
[45] Date of Patent: Jun. 6, 2000

[54] PORTABLE INFORMATION PROCESSING APPARATUS HAVING SELECTABLY CONTROLLABLE VIDEO CONTROLLER RESPONSIVE TO REMOVAL OF DISPLAY PANEL

[75] Inventors: Kazuhiko Maeda; Rieko Kataoka, both of Sagamihara; Masaki Kobayashi, Machida, all of Japan

[73] Assignee: International Business Machines Corporation, Armonk, N.Y.

[21] Appl. No.: 08/891,927

[22] Filed: Jul. 14, 1997

[30] Foreign Application Priority Data

Sep. 9, 1996 [JP] Japan .................................... 8-237713

[51] Int. Cl.$^7$ ...................................................... G09G 5/00
[52] U.S. Cl. .......................... 345/156; 713/323; 714/14; 714/15; 345/168
[58] Field of Search ..................................... 345/156, 157, 345/168, 169, 173; 395/182.22, 182.12; 364/707, 708.1; 714/14–15; 713/323

[56] References Cited

U.S. PATENT DOCUMENTS

| | | | |
|---|---|---|---|
| 5,008,846 | 4/1991 | Inoue . | |
| 5,233,502 | 8/1993 | Beatty et al. | 361/729 |
| 5,241,303 | 8/1993 | Register et al. | 345/168 |
| 5,375,076 | 12/1994 | Goodrich et al. . | |
| 5,381,043 | 1/1995 | Kohiyama et al. | 307/116 |
| 5,467,469 | 11/1995 | Saito et al. . | |
| 5,467,470 | 11/1995 | Ninomiya . | |

FOREIGN PATENT DOCUMENTS

| | | |
|---|---|---|
| 0371383 | 6/1990 | European Pat. Off. . |
| 0415376 | 3/1991 | European Pat. Off. . |
| 2028816 | 1/1990 | Japan . |
| 3001184 | 1/1991 | Japan . |

*Primary Examiner*—Dennis-Doon Chow
*Assistant Examiner*—Amr Awad
*Attorney, Agent, or Firm*—Bernard D. Bogdon

[57] ABSTRACT

A portable information processing apparatus, having a detachable liquid crystal display panel/input tablet, whereof the liquid crystal display panel/input tablet can be detached from the apparatus even when the main body is powered on, i.e., is being operated. The portable information processing apparatus comprises: support means for detachably supporting a liquid crystal display panel on a main body; detection means for detecting detachment/attachment of the liquid crystal display panel; and first and second connectors for providing a connection for video signal lines and a power line that connect the liquid crystal display panel and the main body. When the liquid crystal display panel is detached from the main body, the first and the second connectors can communicate with each other via a cable. When the detection means detects that the liquid crystal display panel has been detached, the output of video signals from the main body to the display panel is disabled, and then the power supply to the liquid crystal display panel is halted (local suspend). As a result, the disorderly open state of the signal output line and the power line to the display panel is avoided, and the deterioration of hardware is prevented. In parallel to the local suspend operation, the main body of the apparatus saves data required for the resumption of a task, and halts the operation of the entire system (system suspend).

5 Claims, 11 Drawing Sheets

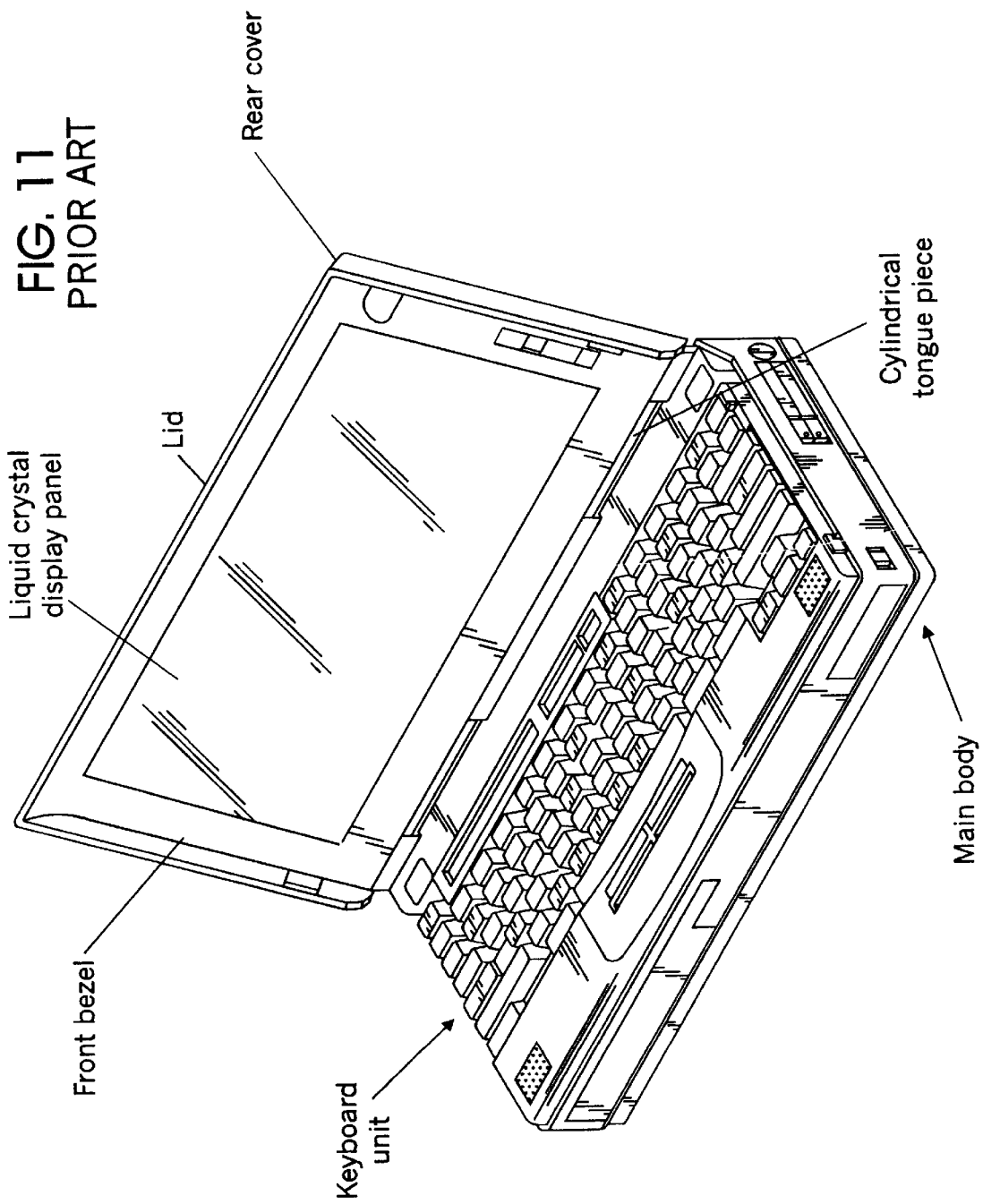

PORTABLE INFORMATION PROCESSING APPARATUS HAVING SELECTABLY CONTROLLABLE VIDEO CONTROLLER RESPONSIVE TO REMOVAL OF DISPLAY PANEL

FIELD OF THE INVENTION

The invention relates to a portable information processing apparatus comprising a main body for accommodating a primary controller and other media, and a display unit pivotally hinged on the main body at the rear end and in which a liquid display panel is provided. It relates in particular to a portable information processing apparatus including the liquid crystal display panel of the type which can be detached from the main body. More specifically, the invention pertains to a portable information processing apparatus having the liquid crystal display panel of the type which can be detached from the main body even while the apparatus is powered on, i.e., is being operated.

BACKGROUND OF THE INVENTION

In accordance with recent developments in techniques, compact, light personal computers (hereinafter also referred to as "portable computers" or "notebook computers") are being designed and manufactured for which portability is an important consideration, and such computers are in wide, practical use.

In FIG. 11 is shown a common notebook computer. The notebook computer comprises a thin main body and a display unit that is rotatably coupled to the main body.

The main body includes a shallow case. A keyboard unit, that serves as an input device, is provided on the top surface of the case. In the case are retained a system board, on which are mounted a CPU, RAM, ROM and a variety of peripheral controllers; auxiliary storage devices, such as a hard disk drive and a CD-ROM; and a battery/power supply circuit (not shown). The keyboard unit also serves as the upper face of the case and also shields the interior of the main body.

The display unit is constituted by a shallow rear cover, and a front bezel that supports a liquid crystal display panel that is positioned almost in the center of the cover. Inside the display unit that is enclosed by the front bezel and the rear cover, a backlight unit is provided for illuminating the images produced on the liquid crystal display panel. The backlight unit includes a backlight (cold-cathode tube: CFL), a light conducting plate, and a light diffusion plate (none of which are shown in FIG. 11). A pair of almost cylindrical protrusions are integrally formed at the lower edge of the display unit. These protrusions engage and are hinged at bearings on the main body so that they rotatably support the display unit.

As a consequence of the fact that a notebook computer can be used in a mobile environment, i.e., while being carried or an arbitrary location outside the office, and that a user's needs may vary, employment applications for the notebook computers also vary accordingly. The employment of a notebook computer as auxiliary presentation means is a typical example. For this application, members (a rear cover and a light diffusion plate) on the rear face of the liquid crystal display panel are removed to make the panel transparent, and the notebook computer is then placed atop the light source for an overhead projector (OHP) for use as a file. A notebook computer designed for a presentation needs is disclosed in, for example, Japanese Patent Application No. Hei 7-43851 and Hei 7-43925, both of which are assigned to the present assignee. Notebook computer "IBM ThinkPad 755CV/CDV," which is sold by IBM Japan, Co., Ltd., can be mounted on an OHP. Another application example for a notebook computer is as a pen input computer that is used by positioning, on a display panel, a plate (tablet) for which pressure or electromagnetic induction is used to detect designated coordinates.

One measure that is taken to improve such OHP use and the usability of pen input is the provision of a liquid crystal display panel so designed that it can be detached from a main body, the liquid crystal display panel and the main body being connected by a cable (see FIG. 12). In this case, exchange of input/output signals for the liquid crystal display panel and an input tablet and a power supply are performed via the cable. Once the liquid crystal display panel has been removed from the body, it has no mechanical contact nor force by the main body other than the cable. Thus, a user can freely employ the display panel within a range allowed by the length of the cable. For OHP use, it is easier to position the liquid crystal display panel on an OHP light source once it has been removed from the notebook computer. For pen input, the input operation can be performed more stably with a tablet removed from the main body and placed on a desk than with a tablet that is hinged with the main body.

A portable computer whereof a liquid crystal display panel is detachable from the main body and whereof the main body and the liquid crystal display panel are connected by a cable is disclosed in, for example, Japanese Unexamined Patent Publication Nos. Hei 2-210524, Hei 2-228690, Hei 3-1184.

As is mentioned in the previous sub-division, a structure wherein a liquid crystal display panel is detachable from the main body of a portable computer is very useful when the portable computer is used for operations other than for ordinary keyboard input (i.e., for use with an OHP and for pen input). It is obvious that usability will be enhanced if the detachment of the display panel can be performed even while the main body is powered on, i.e., is being operated. While inputting data or editing text at the keyboard of a notebook computer, a user can give a presentation or can change to pen input without the complete closing of a currently executing program being required, merely by removing a liquid crystal display panel and connecting it to the main body of a computer with a cable.

The liquid crystal display panel and the main body are electrically connected to each other. In the power-ON state, i.e., during the exchange of electric signals between the two sections, a disorderly electric disconnection or a reboot may result in some problems, such as the deterioration of the hardware. These problems will now be briefly explained.

(1) A liquid crystal display panel is powered by the main body, and driven by the RGB video signals and a sync signal from a video controller that is incorporated in the main body. In other words, the liquid crystal display panel is an output device and outputs no signals to the main body. A power ON/OFF sequence for the liquid crystal display panel, and input timing for video and sync signals, strictly conform to the standardized specification of this art. When the liquid crystal display panel is detached during the system operation, this may be a violation of the standards, and when, for example, signal output lines and a power line are opened at a disorderly timing, deterioration of hardware may occur.

(2) When a liquid crystal display panel serves as an input tablet, an output signal is sent from the tablet to the main body. Normally, the system monitors this tablet output signal as a peripheral device input. When the input line is disorderlily disconnected, an erroneous input will occur at the main body occurs and will cause the computer to hang up.

That is, careless detachment of the liquid crystal display panel from the computer main body during system operation will cause the system to malfunction and the hardware to deteriorate.

In addition, several tens of seconds to several minutes are normally required to remove the liquid crystal display panel/input tablet from the main body and to connect it to the main body by cable. During such removal/attachment process, a currently active application may be progressed, so that a user may not be able to recover the contents of the progressed application when the re-connection is completed. For a user it is very inconvenient to completely close down a currently active program (an OS or an application) and turn off the power each time the liquid crystal display panel/input tablet is disconnected, and to turn on the power and restart the program when the display panel and the main body are reconnected.

However, Japanese Unexamined Patent Publication No. Hei 210524, Hei 2-228690 and Hei 3-1184 disclose only that the liquid crystal display panel is mechanically detachable, and do not teach the hardware related electric problem associated with the detachment process during the system operation, and the problem that arises as a result of the loss of the contents of an application, i.e., on the interruption of a task.

It is therefore one object of the present invention to provide a superior portable information processing apparatus that comprises a main body, in which a primary controller and media are retained; and a display unit, which is rotatively hinged at the rear edge of the main body and which has an internally mounted liquid crystal display panel/input tablet.

It is another object of the present invention to provide a superior portable information processing apparatus having a liquid crystal display panel/input tablet that is detachable from a main body.

It is an additional object of the present invention to provide a superior portable information processing apparatus having a liquid crystal display panel/input tablet that can be detached from the apparatus even when the main body is powered on, i.e., is being operated.

It is a further object of the present invention to provide a superior portable information processing apparatus wherewith, even though a liquid crystal display panel is detached from/attached to the apparatus while a program is being executed by the main body, a user does not lose the contents of the program that has being executed during the detachment/attachment process.

SUMMARY OF THE INVENTION

To achieve the above objects, according to a first aspect of the present invention, a portable information processing apparatus, that includes a main body for accommodating primary electric parts and a power source, and a display panel for displaying processed data, comprises: (a) support means for detachably supporting the display panel; (b) a video controller, accommodated in the main body, for outputting video signals that control displayed contents on the display panel; (c) a first interface circuit, provided on the main body, for sending the video signals to the display panel; (d) a second interface circuit, provided on the display panel, for receiving the video signals from the main body; (e) a power line along which power source supplies power to the display panel; (f) first and second connectors for disconnecting/connecting the first and the second interface circuits; (g) detection means for detecting mechanical removal of the display panel from the support means; (h) disabling means for, upon a detection performed by the detection means, disabling output of the video signals by the first interface circuit; and (i) power cutoff means for, after output is disabled by the disabling means, halting power supply by the power source to the display panel.

According to a second aspect of the present invention, a portable information processing apparatus, that includes a main body for accommodating primary electric parts and a power source, and a display panel for displaying processed data, comprises: (a) support means for detachably supporting the display panel; (b) a video controller, accommodated in the main body, for outputting video signals that control displayed contents on the display panel; (c) a first interface circuit, provided on the main body, for sending the video signals to the display panel; (d) a second interface circuit, provided on the display panel, for receiving the video signals from the main body; (e) a power line along which power source supplies power to the display panel; (f) first and second connectors for disconnecting/connecting the first and the second interface circuits; (g) detection means for detecting mechanical removal of the display panel from the support means; (h) disabling means for, upon a detection performed by the detection means, disabling output of the video signals by the first interface circuit; (i) power cutoff means for, after output is disabled by the disabling means, halting supply of power by the power source to the display panel; and (j) operation halting means for, upon a detection by the detection means, saving an operating condition of the apparatus and for halting operation of the apparatus.

According to a third aspect of the present invention, a portable information processing apparatus, that includes a main body for accommodating primary electric parts and a power source, and a display panel for displaying processed data, comprises: (a) support means for detachably supporting the display panel; (b) a video controller, accommodated in the main body, for outputting video signals that control displayed contents on the display panel; (c) a first interface circuit, provided on the main body, for sending the video signals to the display panel; (d) a second interface circuit, provided on the display panel, for receiving the video signals from the main body; (e) a power line along which power source supplies power to the display panel; (f) first and second connectors for disconnecting/connecting the first and the second interface circuits; (g) detection means for detecting mechanical attachment of the display panel from the support means; (h) power supply means for, upon a detection performed by the detection means, starting to supply power from the power source to the display panel; and (i) enabling means for, after the power supply means has begun to supply power, enabling output of the video signals across the first interface circuit.

According to a fourth aspect of the present invention, a portable information processing apparatus, that includes a main body for accommodating primary electric parts and a power source, and a display panel for displaying processed data, comprises: (a) support means for detachably supporting the display panel; (b) a video controller, accommodated in the main body, for outputting video signals that control displayed contents on the display panel; (c) a first interface circuit, provided on the main body, for sending the video signals to the display panel; (d) a second interface circuit, provided on the display panel, for receiving the video signals from the main body; (e) a power line along which power source supplies power to the display panel; (f) first and second connectors for disconnecting/connecting the first and the second interface circuits; (g) detection means for detecting mechanical attachment of the display panel from the support means; (h) power supply means for, upon a detection performed by the detection means, starting to supply power from the power source to the display panel; (i) enabling means for, after the power supply means has begun to supply power, enabling output of the video signals across the first interface circuit; and (j) operation restart means for, upon a detection performed by the detection means, restoring for the apparatus an operating condition that has been saved and for resuming operation of the apparatus under the restored operating condition.

According to a fifth aspect of the present invention, a portable information processing apparatus, that includes a main body for accommodating primary electric parts and a power source, and a display panel for displaying processed data, comprises: (a) support means for detachably supporting the display panel; (b) a video controller, accommodated in the main body, for outputting a video signals to control a display on the display panel; (c) a first interface circuit, provided on the main body, for sending the video signals to the display panel; (d) a second interface circuit, provided on the display panel, for receiving the video signals from the main body; (e) a power line along which power source supplies power to the display panel; (f) first and second connectors for disconnecting/connecting the first and the second interface circuits; (g) a cable to connect the first and the second connectors; (h) detection means for detecting that the first connector is connected with the second connector directly or via the cable; (i) power supply means for, upon a detection performed by the detection means, starting to supply power from the power source to the display panel; and (j) enabling means for, after the power supply means has begun to supply power, enabling output of the video signals across the first interface circuit.

According to a sixth aspect of the present invention, a portable information processing apparatus, that includes a main body for accommodating primary electric parts and a power source, and a display panel for displaying processed data, comprises: (a) support means for detachably supporting the display panel; (b) a video controller, accommodated in the main body, for outputting video signals to control displayed contents on the display panel; (c) a first interface circuit, provided on the main body, for sending the video signals to the display panel; (d) a second interface circuit, provided on the display panel, for receiving the video signals from the main body; (e) a power line along which power source supplies power to the display panel; (f) first and second connectors for disconnecting/connecting the first and the second interface circuits; (g) a cable for connecting the first and the second connectors; (h) detection means for detecting that the first connector is connected with the second connector directly or via the cable; (i) power supply means for, upon a detection performed by the detection means, starting to supply power from the power source to the display panel; (j) enabling means for, after the power supply means has begun to supply power, enabling output of the video signals across the first interface circuit; and (k) operation restart means for, upon a detection performed by the detection means, restoring for the apparatus an operating condition that has been saved and for resuming operation of the apparatus under the restored operating condition.

According to a seventh aspect of the present invention, a portable information processing apparatus, that includes a main body for accommodating primary electric parts and a power source, and a display panel for displaying processed data, comprises: (a) support means for detachably supporting the display panel; (b) a video controller, accommodated in the main body, for outputting video signals that control displayed contents on the display panel; (c) a first interface circuit, provided on the main body, for sending the video signals to the display panel; (d) a second interface circuit, provided on the display panel, for receiving the video signals from the main body; (e) a power line along which power source supplies power to the display panel; (f) first and second connectors for disconnecting/connecting the first and the second interface circuits; (g) detection means for detecting mechanical removal of the display panel from, or attachment of the display panel to, the support means; (h) interface control means for, upon a detection performed by the detection means, disabling/enabling output of a video signals across the first interface circuit; (i) power control means for halting/restarting supply of power by the power source to the display panel; and (j) operation halting/resumption means for, upon an occurrence of a predetermined event, saving/restoring for the apparatus an operating condition and for halting/resuming operation of the apparatus under the operating condition, (A) wherein the interface control means disables output of the first interface circuit upon the removal detected by the detection means, and enables output at the first interface circuit in response to the power control means restarting the power supply to the display panel, (B) wherein the power control means halts the power supply to the display panel when the interface control means disables the first interface circuit, and restarts the power supply to the display panel upon the attachment detected by the detection means, and (C) wherein the operation halting/restarting means halts all operations by the apparatus upon detection by the detection means of removal, and restarts all operations by the apparatus upon the detection by the detection means of the attachment.

According to an eighth aspect of the present invention, a portable information processing apparatus, that includes a main body for accommodating primary electric parts and a power source, and an input tablet for inputting coordinates on an input screen, comprises: (a) support means for detachably supporting the input tablet; (b) an input tablet controller, accommodated in the main body, for processing a tablet signal output from the input tablet; (c) a first interface circuit, provided on the main body, for receiving the tablet signal output from the input tablet; (d) a second interface circuit, provided on the input tablet, for sending the tablet output signal to the main body; (e) a power line along which power source supplies power to the input tablet; (f) first and second connectors for disconnecting/connecting the first and the second interface circuits; (g) detection means for detecting mechanical removal of the input tablet from the support means; (h) disabling means for, upon a detection performed by the detection means, disabling input of the tablet output signal to the first interface circuit; and (i) power cutoff means for, after input is disabled by the disabling means, halting supply of power by the power source to the input tablet.

According to a ninth aspect of the present invention, a portable information processing apparatus, that includes a main body for accommodating primary electric parts and a power source, and an input tablet for inputting coordinates on an input screen, comprises: (a) support means for detachably supporting the input tablet; (b) an input tablet controller, accommodated in the main body, for processing a tablet signal output from the input tablet; (c) a first interface circuit, provided on the main body, for receiving the tablet signal output from the input tablet; (d) a second interface circuit, provided on the input tablet, for sending the tablet output signal to the main body; (e) a power line along which power source supplies power to the input tablet; (f) first and second connectors for disconnecting/connecting the first and the second interface circuits; (g) detection means for detecting mechanical removal of the input tablet from the support means; (h) disabling means for, upon a detection performed by the detection means, disabling input of the tablet output signal to the first interface circuit; and (i) power cutoff means for, after input is disabled by the disabling means, halting supply of power by the power source to the input tablet; and (j) operation halting means for, upon a detection by the detection means, saving an operating condition of the apparatus and for halting operation of the apparatus.

According to a tenth aspect of the present invention, a portable information processing apparatus, that includes a main body for accommodating primary electric parts and a power source, and an input tablet for inputting coordinates on an input screen, comprises: (a) support means for detachably supporting the input tablet; (b) an input tablet controller, accommodated in the main body, for processing a tablet signal output from the input tablet; (c) a first interface circuit, provided on the main body, for receiving the tablet signal output from the input tablet; (d) a second interface circuit, provided on the input tablet, for sending the tablet output signal to the main body; (e) a power line along which power source supplies power to the input tablet; (f) first and second connectors for disconnecting/connecting the first and the second interface circuits; (g) detection means for detecting mechanical attachment of the input tablet from the support means; (h) power supply means for, upon a detection performed by the detection means, starting to supply power from the power source to the input tablet; and (i) enabling means for, after the power supply means has begun to supply power, enabling input of the tablet output signal across the first interface circuit.

According to an eleventh aspect of the present invention, a portable information processing apparatus, that includes a main body for accommodating primary electric parts and a power source, and an input tablet for inputting coordinates on an input screen, comprises: (a) support means for detachably supporting the input tablet; (b) an input tablet controller, accommodated in the main body, for processing a tablet signal output from the input tablet; (c) a first interface circuit, provided on the main body, for receiving the tablet signal output from the input tablet; (d) a second interface circuit, provided on the input tablet, for sending the tablet output signal to the main body; (e) a power line along which power source supplies power to the input tablet; (f) first and second connectors for disconnecting/connecting the first and the second interface circuits; (g) detection means for detecting mechanical attachment of the input tablet from the support means; (h) power supply means for, upon a detection performed by the detection means, starting to supply power from the power source to the input tablet; (i) enabling means for, after the power supply means has begun to supply power, enabling input of the table output signal across the first interface circuit; and (j) operation restart means for, upon a detection performed by the detection means, restoring for the apparatus an operating condition that has been saved and for resuming operation of the apparatus under the restored operating condition.

According to a twelfth aspect of the present invention, a portable information processing apparatus, that includes a main body for accommodating primary electric parts and a power source, and an input tablet for inputting coordinates on an input screen, comprises: (a) support means for detachably supporting the input tablet; (b) an input tablet controller, accommodated in the main body, for processing a tablet signal output from the input tablet; (c) a first interface circuit, provided on the main body, for receiving the tablet signal output from the input tablet; (d) a second interface circuit, provided on the input tablet, for sending the tablet output signal to the main body; (e) a power line along which power source supplies power to the input tablet; (f) first and second connectors for disconnecting/connecting the first and the second interface circuits; (g) a cable for connecting the first and the second connectors; (h) detection means for detecting that the first connector is connected with the second connector directly or via the cable; (i) power supply means for, upon a detection performed by the detection means, starting to supply power from the power source to the input tablet; and (j) enabling means for, after the power supply means has begun to supply power, enabling input of the tablet output signal across the first interface circuit.

According to a thirteenth aspect of the present invention, a portable information processing apparatus, that includes a main body for accommodating primary electric parts and a power source, and an input tablet for inputting coordinates on an input screen, comprises: (a) support means for detachably supporting the input tablet; (b) an input tablet controller, accommodated in the main body, for processing a tablet signal output from the input tablet; (c) a first interface circuit, provided on the main body, for receiving the tablet signal output from the input tablet; (d) a second interface circuit, provided on the input tablet, for sending the tablet output signal to the main body; (e) a power line along which power source supplies power to the input tablet; (f) first and second connectors for disconnecting/connecting the first and the second interface circuits; (g) a cable for connecting the first and the second connectors; (h) detection means for detecting that the first connector is connected with the second connector directly or via the cable; (i) power supply means for, upon a detection performed by the detection means, starting to supply power from the power source to the input tablet; (j) enabling means for, after the power supply means has begun to supply power, enabling input of the tablet output signal across the first interface circuit; and (k) operation restart means for, upon a detection performed by the detection means, restoring for the apparatus an operating condition that has been saved and for resuming operation of the apparatus under the restored operating condition.

According to a fourteenth aspect of the present invention, a portable information processing apparatus, that includes a main body for accommodating primary electric parts and a power source, and an input tablet for inputting coordinates on an input screen, comprises: (a) support means for detachably supporting the input tablet; (b) an input tablet controller, accommodated in the main body, for processing a tablet signal output from the input tablet; (c) a first interface circuit, provided on the main body, for receiving the tablet signal output from the input tablet; (d) a second interface circuit, provided on the input tablet, for sending the tablet output signal to the main body; (e) a power line along which power source supplies power to the input tablet; (f) first and second connectors for disconnecting/connecting the first and the second interface circuits; (g) detection means for detecting mechanical removal/attachment of the input tablet from the support means; (h) interface control means for, upon a detection performed by the detection means, disabling/enabling input of the tablet output signal across the first interface circuit; (i) power control means for halting/restarting supply of power by the power source to the input tablet; and (j) operation halting/resumption means for, upon an occurrence of a predetermined event, saving/restoring for the apparatus an operating condition and for halting/resuming operation of the apparatus under the operating condition, (A) wherein the interface control means disables input of the first interface circuit upon the removal detected by the detection means, and enables output at the first interface circuit in response to the power control means restarting the supply of power to the input tablet, (B) wherein the power control means halts the supply of power to the input tablet when the interface control means disables the first interface circuit, and restarts the supply of power to the input tablet upon the attachment detected by the detection means, and (C) wherein the operation halting/restarting means halts all operations by the apparatus upon the detection by the detection means of removal, and restarts all operations by the apparatus upon the detection by the detection means of the attachment.

A portable information processing apparatus is constituted by a main body for accommodating primary electric parts and a power source, and a liquid crystal display panel unit having a liquid crystal display panel. The main body is generally shallow, and is covered by a keyboard unit on the top surface. The liquid crystal display panel unit is pivotally hinged at its rear edge to the main body. When the computer is not being used or is being carried, the liquid crystal display panel unit is closed down on the main body so that the parts of the apparatus form a thin, flat package, and both the liquid crystal display panel and the keyboard unit are shielded and protected from external interference damage. When the apparatus is to be used, the liquid crystal display panel unit is opened until it is almost perpendicular to the main body, thus exposing the liquid crystal display panel and the keyboard unit. In this state, the apparatus is positioned so that it can be manipulated by an operator. An apparatus can also be designed having an input tablet that is mounted on a liquid crystal display panel to enable pen input.

Operation concerning the first through seventh aspects:

According to the first through the seventh aspects of the present invention, a portable information processing apparatus further comprises: support means for detachably supporting the liquid crystal display panel unit relative to the main body; detection means for detecting the detachment of the liquid crystal display unit; and the first and the second connectors for enabling the sending of video signals between the liquid crystal display panel unit and the main body and for constituting a power line connection between them. The liquid crystal display panel unit can be interconnected with the main body, by connecting the first and the second connectors with a cable.

When the detection means detects the removal of the liquid crystal display panel unit, first, output of video signals from the main body to the display panel unit is disabled, and then, the power supply to the display panel unit is halted. The function for disabling the output of the video signals and for halting the power supply to the display panel unit is called "local suspend" in this specification. By the execution of the local suspend process, a disorderly open state of a signal output line and a power line to the display panel unit is avoided, and the deterioration of hardware can be prevented. The local suspend can be easily performed by, for example, giving an output buffer in the interface circuit to the tri-state OFF, which will be described later.

In parallel to the performance of the local suspend, the main body also halts the operation of the entire system after data necessary for task resumption are saved. The function for halting the entire system is called "system suspend" in this specification. By the execution of system suspend, the contents of programs being processed is immediately saved before the liquid crystal display panel unit is removed, so that the saved data can be restored when the liquid crystal display panel unit is reattached. System suspend can be easily performed by, for example, issuing a suspend interrupt to a CPU upon the detection of the removal of the liquid crystal display panel unit by the detection means.

When the detection means detects the reattachment of the liquid crystal display panel unit or its connection by cable, first, the power supply to the display panel unit is begun, and then the output of the video signals from the main body to the display panel unit is enabled. The function for restarting the supply of power to the display panel unit and for enabling the output of the video signals is called "local resume" in this specification. The local resume can be easily performed by, for example, giving the output buffer of the interface circuit to the tri-state ON, which will be described later.

In parallel to the performance of the local resume process, the main body restores the saved data to the respective original sections and resumes the execution of the halted programs. The resumption function is called "system resume" in this specification.

Operation concerning the eighth through fourteenth aspects:

According to the eighth through the fourteenth aspects of the present invention, a portable information processing apparatus further comprises: support means for detachably supporting the input tablet relative to the main body; detection means for detecting the detachment process for the input tablet; and the first and the second connectors for the sending of a tablet output signal between the input tablet and the main body and for the connection of a power line between them. The input tablet can be interconnected with the main body, by connecting the first and second connectors with a cable.

When the detection means detects the removal of the input tablet, first, the input of a tablet signal output from the main body is disabled, and then, the power supply to the input tablet is halted. The function for disabling the input of the tablet output signal and for halting the supply of power to the input tablet is called "local suspend" in this specification. By the execution of the local suspend, a disorderly open state of a signal input line is avoided, and the hanging-up of the unit can be prevented. The local suspend process can be easily performed by, for example, giving an input buffer in the interface circuit to the tri-state OFF, which will be described later.

In parallel to the performance of the local suspend function, the main body halts the operation of the entire system after data necessary for task resumption are saved. The function for halting the entire system is called "system suspend" in this specification. By the execution of the system suspend, the contents of the programs being processed is immediately before the input tablet is removed, so that the saved data can be restored when the input tablet is reattached. The system suspend process can be easily performed by, for example, issuing a suspend interrupt to a CPU in response to the detection of the removal of the input tablet by the detection means.

When the detection means detects the reattachment of the input tablet or its connection by cable, first, the power supply to the input tablet is begun, and then the input of the tablet output signal from the input tablet to the main body is enabled. The function for restarting the power supply to the input tablet and for enabling the input of the tablet output signal is called "local resume" in this specification. The local resume can be easily performed by, for example, giving the input buffer of the interface circuit to the tri-state ON, which will be described later.

In parallel to the performance of the local resume function, the main body restores the saved data to the respective original sections and resumes the halted programs. The resumption function is called "system resume" in this specification.

In the first through the fourteenth aspects of the present invention, the reasons for the parallel performance of the local suspend/resume function and the system suspend/resume function in parallel are as follows:

(1) The system suspend/resume function is performed so that a screen display and the state of processed program is frozen while the liquid crystal display panel/input tablet is being detached from the main body. When it is attached again, the screen display and the frozen program is resumed at the same point at which it was halted.

(2) However, since the system suspend/resume function is associated with data saving/restoring, several hundreds of milliseconds to several seconds are required from the start of the suspend function to its completion, and the suspend function may not provide a fast enough response for a rapid removal manipulation. Therefore, the local suspend/resume function is performed that can be locally and rapidly completed by only giving the output buffer the tri-state ON/OFF condition, and as the result, the rapid removal/attachment of the display panel is supported and the deterioration of hardware is prevented.

In short, according to the present invention, provided is a superior portable information processing apparatus, whereof a liquid crystal display panel/input tablet is detachable from a main body, and whereof a liquid crystal display panel/input tablet can be detached from the apparatus even while the main body is powered on, i.e., is being operated.

In addition, according to the present invention, provided is a superior portable information processing apparatus, whereof a liquid crystal display panel/input tablet is detachable from a main body, and whereof, even though a liquid crystal display panel is removed from/attached to the apparatus while a program is being executed by the main body, a user does not lose the contents of the program that is being executed during the detachment process.

The other objects, features, and advantages of the present invention will become apparent in due course during the detailed description of the embodiment of the present invention, which will be given while referring to the accompanying drawings.

BRIEF DESCRIPTION OF THE DRAWINGS

The invention is pointed out with particularity in the appended claims. The stated advantages of the invention may be better understood by referring to the following detailed description in conjunction with the drawings in which:

FIG. 11 is a diagram illustrating the outline of a common notebook computer.

DETAILED DESCRIPTION OF THE PREFERRED EMBODIMENT

The preferred embodiment of the present invention will now be described in detail while referring to the accompanying drawings.

A. Outline of notebook computer

FIG. 1 is a specific diagram of the appearance of a notebook computer 1 that embodies the present invention.

Figure 1A:
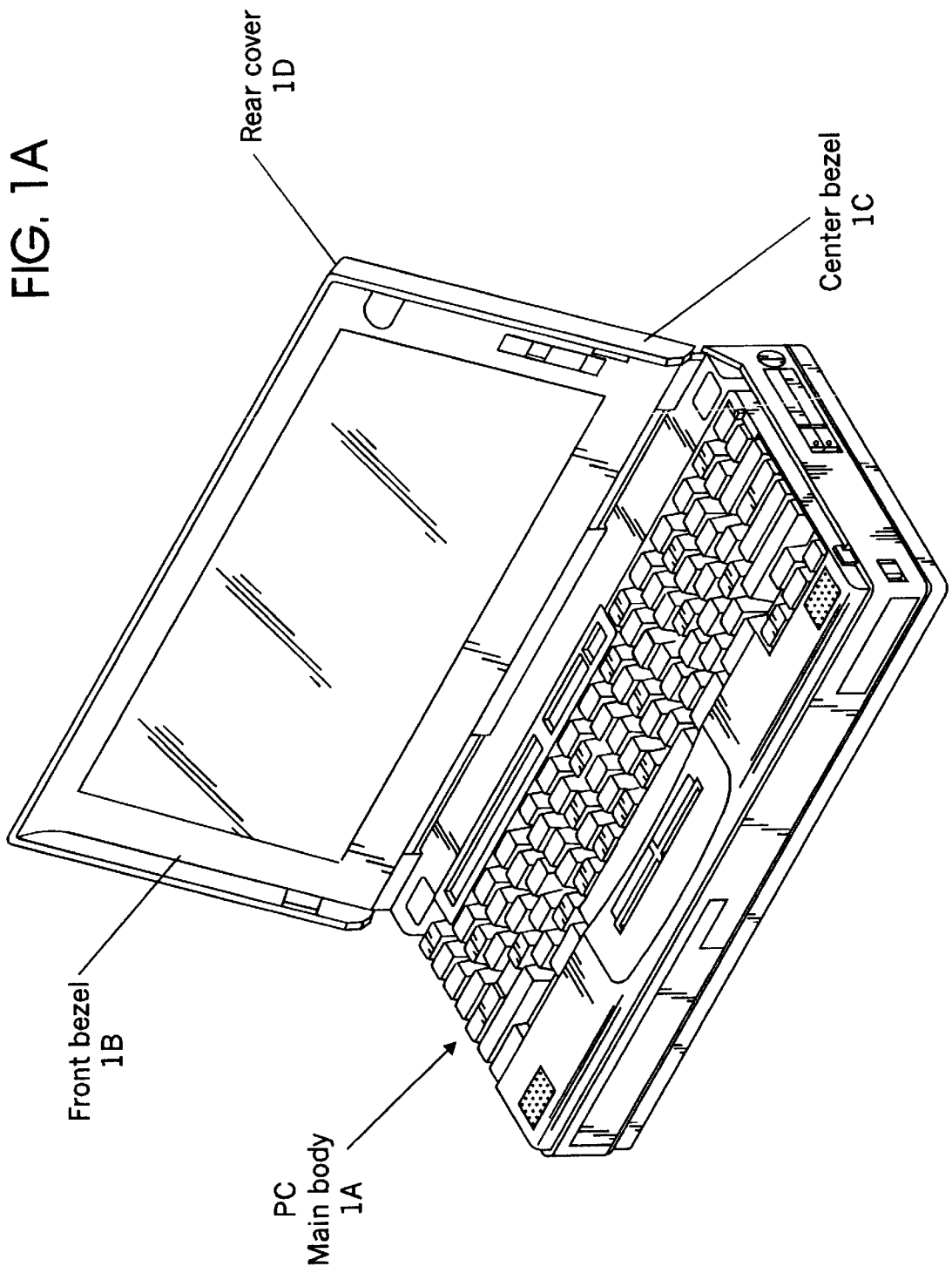
FIG. 1 is a schematic diagram illustrating the hardware arrangement of a personal computer (PC) that is appropriate for carrying out the present invention.

In FIG. 1(a) is shown the notebook computer 1 of the posture in ordinary use. Similarly to the one shown in FIG. 11, the notebook computer 1 is constituted by a thin PC main body 1A and a lid that is rotatively hinged on the PC main body 1A.

Figure 1B:
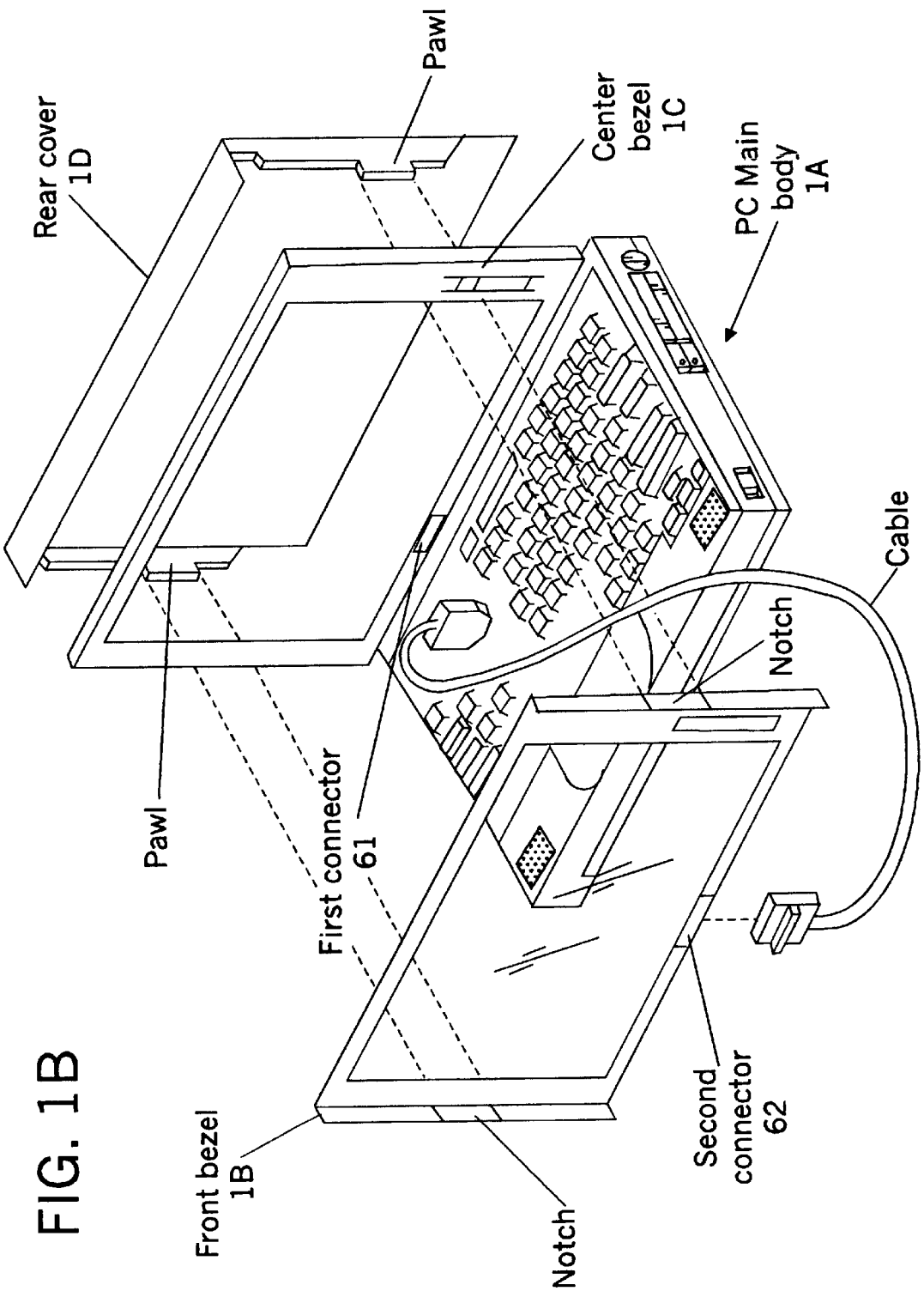

The lid in this embodiment can be separated into a front bezel 1B, a center bezel 1C and a rear cover 1D. In FIG. 1(b) is shown the condition where the front bezel 1B and the rear cover 1D have been removed from the PC main body 1A.

A liquid crystal display (LCD), which is integrally formed with the input tablet, is provided almost in the center of the front bezel 1B. A second connector 62 is provided at the lower edge of the rear face of the front bezel 1B. The second connector 62 can be joined with a first connector 61 (which will be described hereinafter) of the center bezel 1C. By means of the connectors 61 and 62, video signals and tablet output signals are exchanged with, and power is supplied by the PC main body 1A. A pair of notches are formed at the end of either side of the front bezel 1B.

The center bezel 1C is hinged with the PC main body 1A and can not be removed therefrom. The front bezel 1B is detachably mounted on the front face of the center bezel 1C, while the rear cover 1D is detachably mounted on the rear face. Since the lid is so designed that it can be separated into detachable portions and a hinged portion, as in FIG. 1, the mechanical strength of the hinged portion can be easily maintained. The first connector 61 is provided on the lower edge of the center bezel 1C for electrical connection with the second connector 62. The first connector 61 and the second connector 62 can be connected not only directly but also by using a cable. In the center bezel 1C are retained a cold cathode ray tube (CFL) (FIG. 4) for irradiating the display on the LCD, and an inverter for generating power to drive the cold cathode ray tube (which will be described hereinafter).

The rear cover 1D, a member for covering the rear face of the LCD, has, almost in the center, a light conducting plate for diffusing light from the cold cathode ray tube and uniformly reflecting it to the front face. When the rear cover 1D is removed from the center bezel 1C, the LCD 21 becomes transparent, and can thus be used as a substitute of OHP foil. A pair of pawls are formed on either side of the rear cover 1D. The pawls are to be engaged into the corresponding notches of the front bezel 1B, so that the front bezel 1B is joined together with the rear cover 1D as if the center bezel 1C is sandwiched between them.

B. Hardware arrangement of notebook computer

Figures 2, 2A:
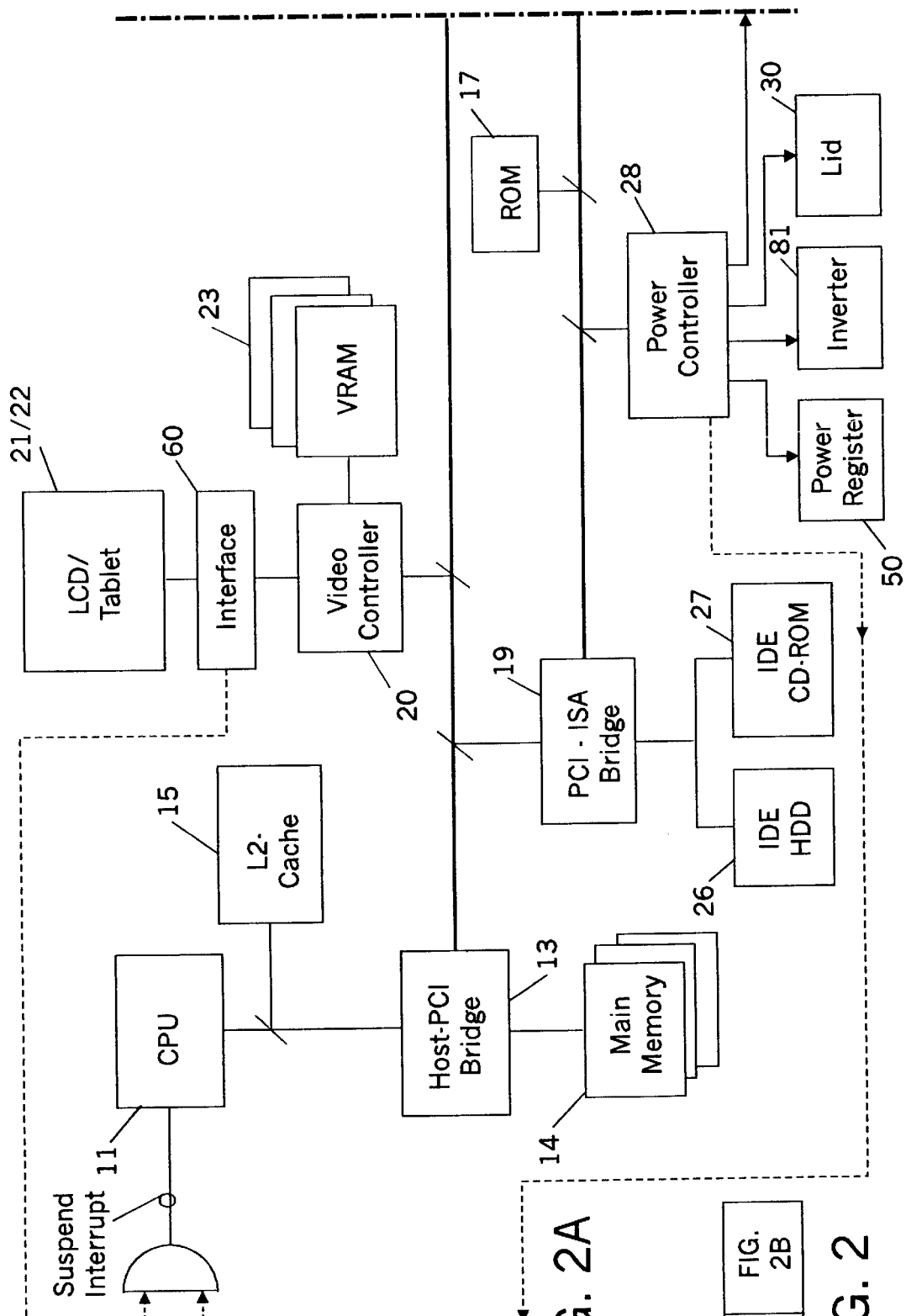
FIG. 2 is a schematic diagram illustrating the hardware arrangement of a notebook computer 1 that is appropriate for carrying out the present invention.
Figure 2B:
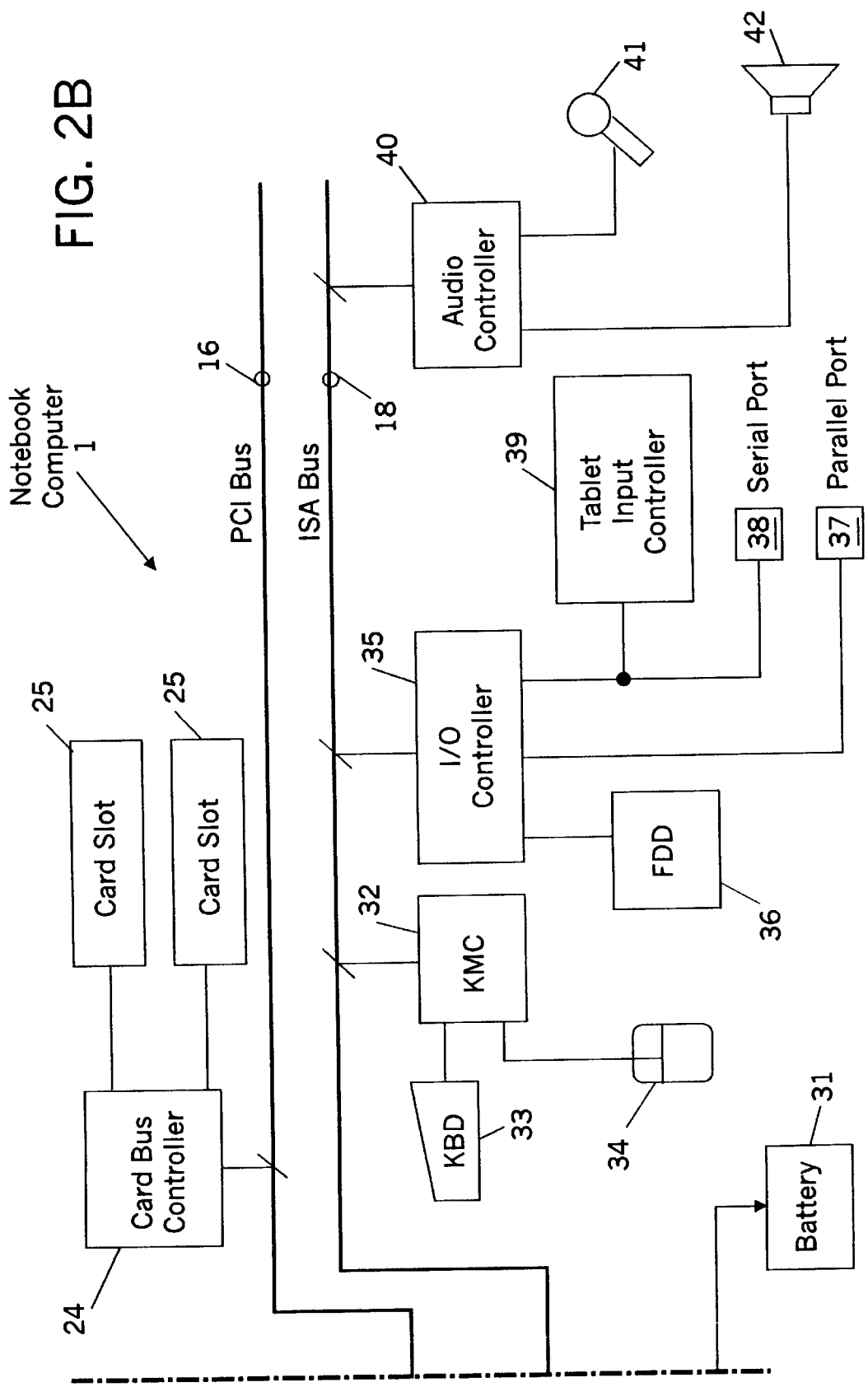

FIG. 2 is a schematic diagram illustrating the hardware arrangement of a notebook computer 1 that embodies the present invention.

A CPU 11, a main controller, executes various programs under the control of an operating system (OS). The CPU 11 may be, for example, a "Pentium/1xx MHz," of Intel Corp. The OS may be, for example, "OS/2," of IBM Corp. ("OS/2" is a trademark of IBM Corp.), or "Windows 95," of Microsoft Corp. The CPU 11 in this embodiment receives as an ORed signal a suspend interrupt signal issued by an interface 60 or by a power controller 28. In response to the occurrence of an interruption, the CPU 11 executes a predetermined interrupt handler. In this context, a request for "suspend interrupt" is the equivalent of a request for "system suspend."

The CPU 11 is mutually connected with peripheral devices, which will be described later, via three buses: a processor bus 12 that is directly connected to an external pin of the CPU 11, a PCI (Peripheral Component Interconnect) bus 16 serving as a local bus, and an ISA (Industry Standard Architecture) bus 18 as an input/output bus.

The processor bus 12 communicates with the PCI bus 16 via a bridge circuit (host-PCI bridge) 13. The bridge circuit 13 in this embodiment includes a memory controller for controlling access to a main memory 14, and a data buffer for absorbing a difference in the speeds of the buses 12 and 16.

The main memory 14 is used as an area in which programs are loaded and as a work area for a currently executing program, and is generally constituted by DRAM (dynamic RAM) chip. An L2-cache 15 is a high-speed memory for absorbing the time for accessing the main memory 14, and is generally constituted by SRAM (static RAM) chip. A ROM 17 is nonvolatile memory in which are permanently stored basic commands (e.g., BIOS: Basic Input/Output System) for manipulating peripheral devices (e.g., a video controller 20, a keyboard 33, an HDD 26, an FDD 36, etc.) and a test program (e.g., POST: Power On Self Test) that is executed when the system is powered on.

The PCI bus 16 is a bus (with a bus width of 32 bits, an operating frequency of 33 MHz, and a maximum data transfer speed of 132 KBps) that enables the high-speed data transfer. The peripheral devices that are driven at a relatively high speed, such as the video controller 20 and a card bus controller 24 are connected to the PCI bus 16.

The video controller 20 is a dedicated controller for the actual processing of drawing commands issued by the CPU 11. The video controller 20 temporarily stores processed drawing information in a screen buffer (VRAM) 23, and reads it from the VRAM 23 and outputs it to the liquid crystal display (LCD) 21.

The liquid crystal display 21 in this embodiment is laminated with the input tablet 22, and pen input can be performed on the screen of the display 21. A tablet output signal by the input tablet 22 is decoded, and the decoded signal is processed by a tablet input controller 39, which will be described later. The liquid crystal display/input tablet unit 21/22 can be physically detached from the PC main body 1A at the interface 60, which will also be described later. The interface 60 passes signal lines, for video signals and tablet output signals, and a power line between the display/tablet unit 21/22 and the PC main body 1A, and detects the detachment of the display/tablet unit 21/22. The result of the detection of the detachment is reported as a suspend interrupt signal to the CPU 11, which will be described later.

The card bus controller 24 is a dedicated controller for outputting a bus signal on the PCI bus 16 to a PC card slot 25. A PC card, which conforms to the standards (ex. "PC Card Specification 95") that are specified by PCMCIA (Personal Computer Memory Card International Association)/JEIDA (Japan Electronic Industry Development Association), can be inserted into the card slot 25.

The PCI bus 16 and the ISA bus 18 are mutually connected by a bridge circuit (PCI-ISA bridge) 19. The bridge circuit 19 in this embodiment includes a DMA controller, a programmable interrupt controller (PIC), and a programmable interval timer (PIT).

The bridge circuit 19 in this embodiment also has an IDE interface connector for connecting an external IDE (Integrated Drive Electronics) storage device. The IDE hard disk drive (HDD) 26 and an IDE CD-ROM drive 27 can be connected to the IDE connector.

The bridge circuits 13 and 19 are specified by the PCI, and are generally provided in the form of a single chip set. An example chip set is "Triton" sold by Intel Corp.

The ISA bus 18 (with a 16-bit bus width and a highest data transfer speed of 4 MBps) has a slower data transfer speed than the PCI bus 16 and is used for the connection of peripheral devices, such as an I/O controller 35, a keyboard/mouse controller 32, an audio controller 40 and the power controller 28, that are driven at a relatively low speed.

The keyboard/mouse controller 32 is a dedicated peripheral controller that fetches, as computer data, scan code data input at a keyboard 33 and coordinate values input at a mouse/track point 34.

The I/O controller 35 is a peripheral controller for driving the floppy disk drive (FDD) 36 and for controlling the exchange of serial or parallel data with an external device, e.g., a modem or a printer (not shown). A tablet signal output by the input tablet 22 is processed by the tablet input controller 39, and the resultant serial signal is transmitted to the I/O controller 35.

The audio controller 40 is a dedicated controller for inputting/outputting an audio signal. The audio controller 40 fetches as computer data audio signals from a microphone 41, or performs DA conversion of audio data and outputs the results through a loudspeaker 42.

The power controller 28 is a peripheral controller primarily for managing the power supply to the respective sections of the system. The power controller 28 is preferably a one-chip microcomputer "300/H8" produced by Hitachi Ltd. This type of IC incorporates a RAM, a ROM and a timer in addition to a 16-bit processor, and its function is programmable. The power controller 28 in this embodiment is especially programmed to monitor the remaining power of a built-in battery 31 and the open/closed state of the liquid crystal display panel/input tablet 21/22 (the lid) relative to the main body 1A, and instructs the powering on or off of the respective sections of the system in accordance with the monitoring results. The controller 28 also instructs an inverter 81 to adjust the light intensity of a cold cathode ray tube 82. When, for example, the remaining power of the battery 31 is reduced and system operation can not be continued, or the lid is closed and the use of the system is halted the power controller 28 issues a suspend interrupt (a request for a system suspend function) to the CPU 11, and halts the power supply to the respective sections. The power controller 28 also reduces the light intensity of the cold cathode ray tube 82, or halts its emissions, in accordance with the remaining power of the battery 31. The power controller 28 generates a signal to a power control register 50 to instruct powering on and off, which will be described later.

Many electric circuits, etc., other than those shown in FIG. 1 are required to constitute the notebook computer 1. Only a general explanation is given for hardware components that are not essential to the present invention, or no explanation for them is given in the specification to avoid the inclusion of complicated drawings and to simplify the explanation.

Figure 3:
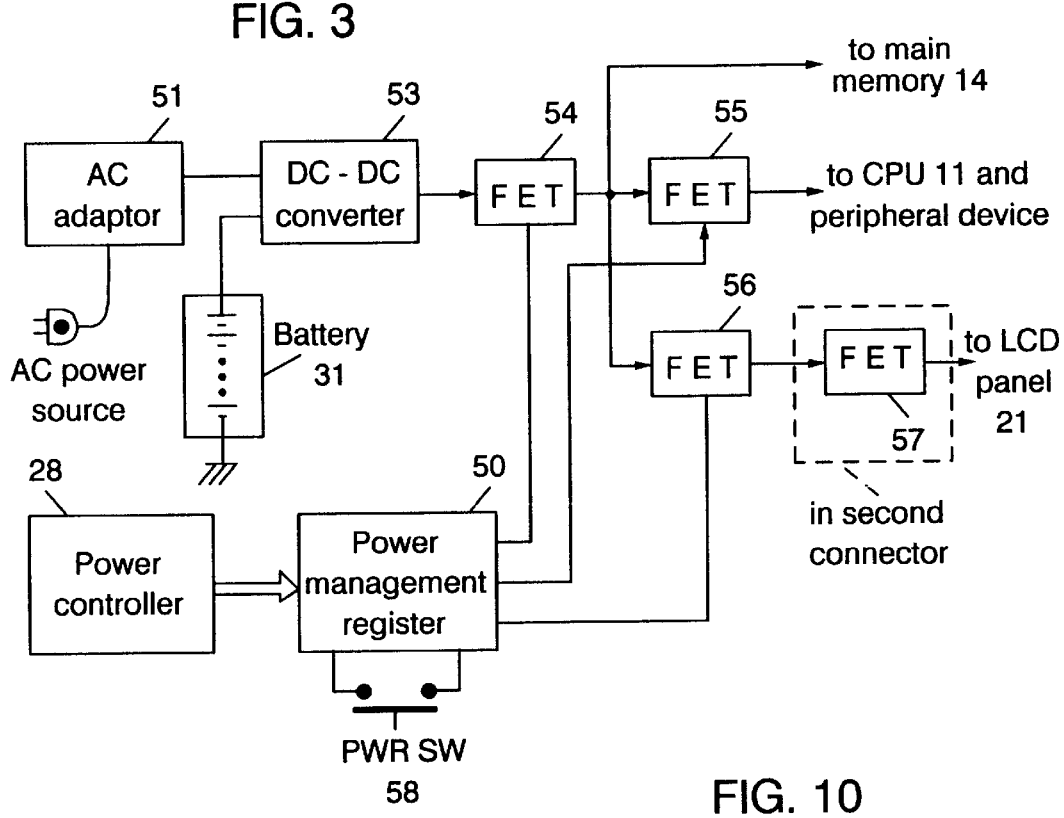
FIG. 3 is a schematic diagram illustrating the power supply to the respective sections of the notebook computer.

FIG. 3 is a schematic diagram illustrating the power supply circuit for the respective sections in the notebook computer 1.

The notebook computer 1 employs, as a main power source, a commercially available power source (AC power source) or the built-in battery 31. DC power obtained via an AC adaptor 51, and power from the battery 31 are connected in parallel to a DC/DC converter 53.

A DC voltage stabilized by the DC/DC converter 53 is supplied to an FET switch 54 with which the entire system can be powered off at one time. The DC power via the FET switch 54 is sent to the main memory 14, to the CPU 11 and the peripheral devices via an FET switch 55, and to the liquid crystal display panel 21 via two FET switches 56 and 57.

The gate terminals of the FET switches 54, 55 and 56 are electrically connected to corresponding bit cells of the power control register 50. The power controller 28 emits a signal to the power control register 50 to write the contents in the corresponding bit cells, so that the power supply conditions to the respective sections can be changed.

For example, in the state wherein the FET switch 54 is off, the entire system is powered off. In the system suspend state (which will be described later), the FET switch 54 is maintained on while successive FET switches 55 and 56 are turned off, so that only the supply of power to the main memory 14 is maintained to save data. The state wherein only the FET switch 56 is off is a so-called "LCD panel off mode." A power on switch 58 is coupled with the power control register 50. The contents of the bit cells of the power control register 50 are cleared by the manipulation of the power on switch 58. As the result of the clearing, the power supply to the whole sections is begun.

An FET switch 57, that is connected to the output side of the FET switch 56, is provided in the interface 60. The ON/OFF operation of the FET switch 57 is performed not by the power controller 28, but in response to the detection, by the interface 60, of the detachment of the liquid crystal display panel/input tablet unit 21/22. The arrangement and the operation employed for this purpose will be described later in detail.

Figure 4:
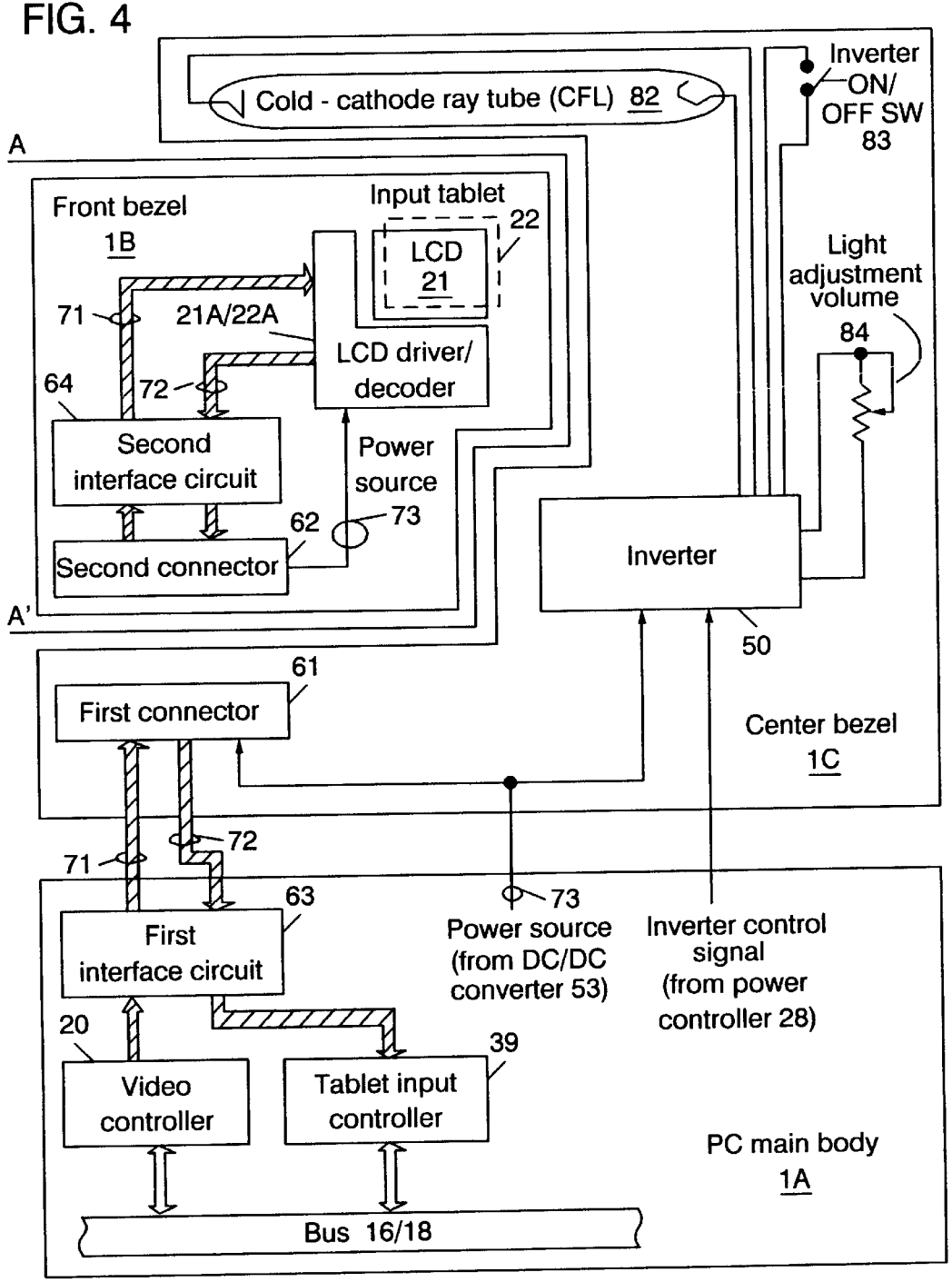
FIG. 4 is a diagram illustrating the essential portions of a display mechanism and a tablet input mechanism in the notebook computer.

FIG. 4 is a diagram illustrating the essential display mechanism and tablet input mechanism of the notebook computer 1.

As was previously mentioned, the notebook computer 1 is constituted by the PC main body 1A and the lid that is rotatively hinged at the rear edge of the PC main body 1A. The lid comprises the front bezel 1B, the center bezel 1C and the rear cover 1D (not shown in FIG. 4).

The PC main body 1A incorporates a system board (not shown) on which are mounted various controller chips, such as the CPU 11, the video controller 20 and the tablet input controller 39 and so on. Further, a first interface circuit 63 for exchanging electric signals with the lid is also included. The electric signals exchanged are video signals 71 for driving the LCD 21, and signals 72 output by the input tablet 22. The video signals 71 include a RGB signal and synchronization signals, such as hsync and vsync signals. In addition, a power line 37 for feeding power to the electrically active portions of the lid is led from the PC main body 1A, and a signal for controlling the inverter 81, which will be described later, is output by the PC main body 1A.

The LCD 21 that is integrally formed with the input tablet 22 is provided almost on the center of the front bezel 1B. The front bezel 1B also includes an LCD driver 21A, for driving the LCD 21 in accordance with received video signals 71; a decoder 22A, for decoding an input signal from the tablet 22; and a second interface circuit 64, for exchanging the video signals 71 and the tablet output signal 72 with the PC main body 1A via a first interface circuit 63. The front bezel 1B is detachable from the center bezel 1C at the separation line A–A' in FIG. 4. The electric connection at the line A–A' is accomplished by using the first connector 61 of the center bezel 1C and the second connector 62 of the front bezel 1B. The first and second connectors 61 and 62 may be electrically connected either directly or by cable (not shown).

The center bezel 1C is so hinged that it can not be removed from the PC main body 1A. The signal lines 71 and 72 and the power line 37 that connect the main body 1A and the front bezel 1B pass through the center bezel 1C. The center bezel 1C includes the first connector 61, for electric connection with the front bezel 1B; the cold cathode ray tube 82, for irradiating the display on the LCD 21; and the inverter 81, for generating a power source to drive the cold cathode ray tube 82. The inverter 81 is driven by power received from the PC main body 1A, and adjusts the light intensity of the cold cathode ray tube 82 in accordance with an inverter control signal. The inverter 81 has a switch 83 for turning itself on and off, and a light volume 84 for manually adjusting the light intensity. The ON/OFF switch 83 is, for example, a micro-switch that is activated in response to the removal of the rear cover 1D, and shuts down the cold cathode ray tube 82, which is exposed when the rear cover 1D is removed. The light volume 84 interacts with, for example, a slide knob (not shown) that is provided on the surface of the center bezel 1C, and adjusts the output of the inverter 81.

The rear cover 1D (not shown in FIG. 4) is a member for covering the rear face of the LCD 21, and includes a light conducting plate for diffusing light emitted by the cold cathode ray tube 82 and uniformly reflecting it toward the front side. When the rear cover 1D is removed from the center bezel 1C, the LCD panel 21 becomes transparent and can be used as a substitute for OHP foil. It should be noted that the structure of the rear cover 1D, for example, the mechanical design of the detachable rear cover 1D, is immaterial to the subject of the present invention.

Figure 5:
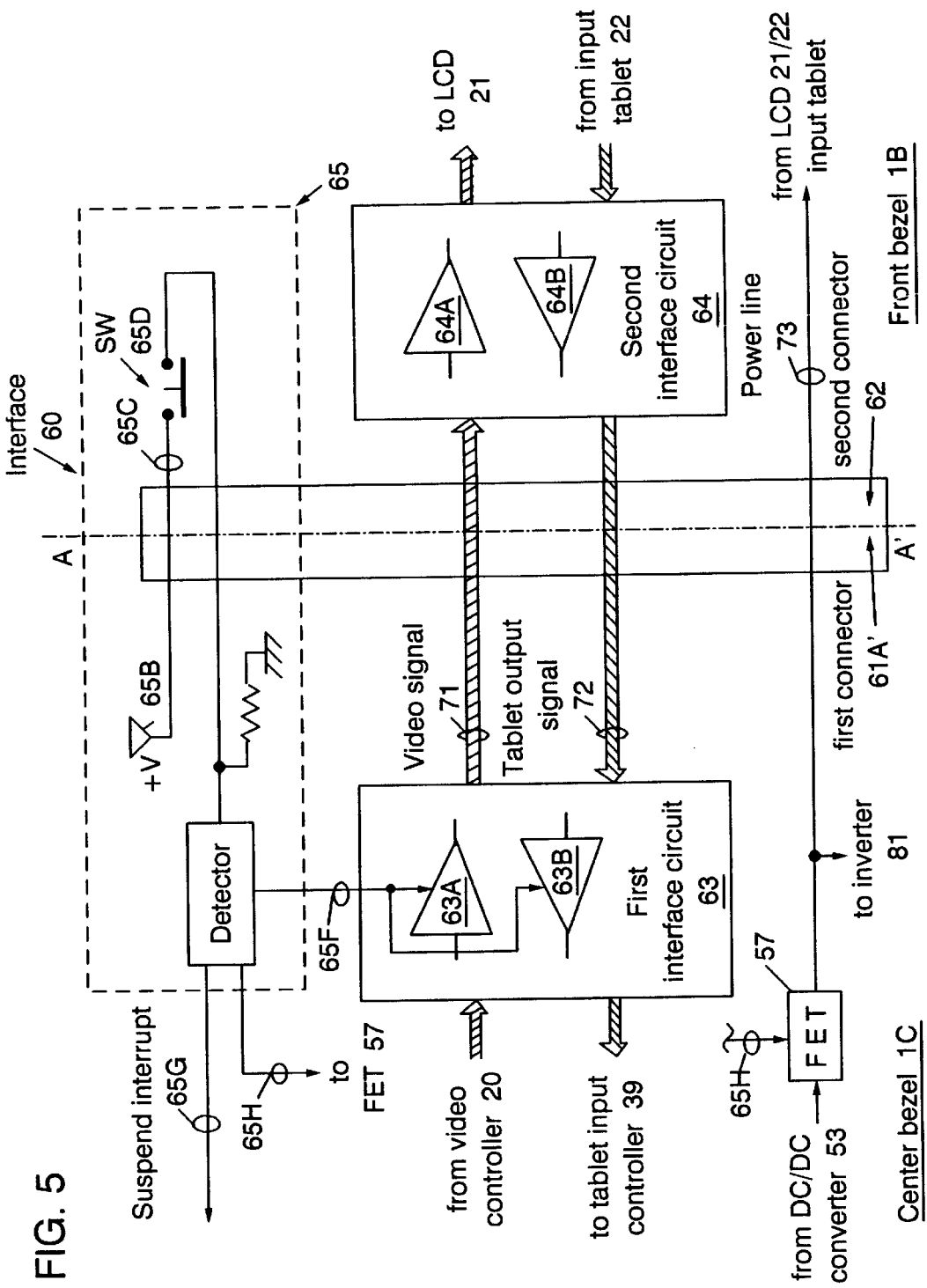
FIG. 5 is a diagram illustrating the essential portion in a detachment mechanism for a liquid crystal display panel/input tablet.

FIG. 5 is a diagram illustrating the essential portion of a detachment mechanism for the liquid crystal display panel/input tablet unit 21/22. This corresponds to the interface 60 in FIG. 2.

The portion to the right of the separation line A–A' that extends vertically across the center of the drawing belongs to the front bezel 1B, while the portion to the left of the line A–A' belongs to the center bezel 1C. The two bezels are connected together by the first and second connectors 61 and 62. These connectors 61 and 62 may be connected together either directly or by cable.

The first interface circuit 63 and the second interface circuit 64, for exchanging electric signals, etc., are provided respectively on the front bezel 1B and the center bezel 1C. The first interface circuit 63 includes an output buffer 63A, for outputting the video signals 71 received from the video controller 20; and an input buffer 63B, for receiving the tablet output signal 72 and transferring it to the tablet input controller 39. The second interface circuit 64 includes an input buffer 64A, for receiving the video signals 71 and transferring it to the LCD 21; and an output buffer 64B, for outputting the tablet signal 72 at the input tablet 22.

The power line 73, along which power is fed to the LCD 21 and the input tablet 22, passes through the FET switch 57 to the front bezel 1B. The power line 73 branches on route to the inverter 81.

A block 65 is a mechanism for detecting the detachment of the front bezel 1B. The block 65 includes a detection line 65C and a detector 65A for detecting the detachment in accordance with a voltage level at the detection line 65C. One end of the detection line 65C is pulled up by power voltage +V, and the other end is connected to the detector 65A. Along the detection line 65C are provided a micro-switch 65D that is turned on and off while interacting with the removal of the front bezel 1B, and a pull-down resistor 65E.

When the front bezel 1B is attached to the center bezel 1C, or when the front bezel 1B is connected to the center bezel 1C by a cable, power voltage +V is input to the detector 65A. When the micro-switch 65D is turned off, while interacting with the removal of the front bezel 1B, or when the detection line 65C is opened as the result of the removal of the front bezel 1B, the supply of the power voltage +V is cut off, and a ground level voltage is input to the detector 65A. When the input voltage level is changed from high to low, the detector 65A can detect the removal of the front bezel 1B from the center bezel 1C. When the input level is changed from low to high, the detector 65A can detect the attachment of the front bezel 1B to the center bezel 1C or its connection to it by cable.

The main function of the detector 65A is to permit the local suspend/resume operation or the system suspend/resume operation in response to the removal/attachment of the front bezel 1B. More specifically, when the detector 65A detects the removal of the front bezel 1B, it disables, across a signal line 65F, the input/output buffers 63A and 63B in the interface circuit 63, i.e., sets the buffers 63A and 63B to the tri-state OFF condition. Further, the detector 65A issues a suspend interrupt to the CPU 11 across a signal line 65G. When a certain delay period (several tens or several hundreds of milliseconds) has expired after the input/output buffers 63A and 63B were disabled, by using a signal line 65H the FET switch 57 is turned off to halt the supply of power to the front bezel 1B. The certain delay period is a period that is taken to ensure that the disabled condition of the buffers 63A and 63B is stabilized.

When the detector 65A detects the attachment of the front bezel 1B, it emits a signal across the signal line 65H to turn on the FET switch 57 to resume the supply of power to the front bezel 1B, and issues a resumed interrupt to the CPU 11 across the signal line 65G. When a certain delay period (several tens or several hundreds of milliseconds) has expired after the power supply began, the detector 65A emits a signal across the signal line 65F to enable the input/output buffers 63A and 63B in the first interface circuit 63, i.e., sets the buffers 63A and 63B to the tri-state ON condition. The certain delay period is a period that is taken to ensure that a supplied voltage is stabilized.

Sub-division C should be referred to as the routine for the local suspend/resume and the system suspend/resume processing.

C. Detachment of display panel/input tablet of notebook computer

Operation

The hardware structure of the notebook computer 1 of the present invention has been explained in the above sub-division. In this sub-division, the processing of the present invention will be specifically described by referring in detail to the internal operation of the notebook computer 1 when the removal/attachment of the front bezel 1B is performed.

Figure 6:
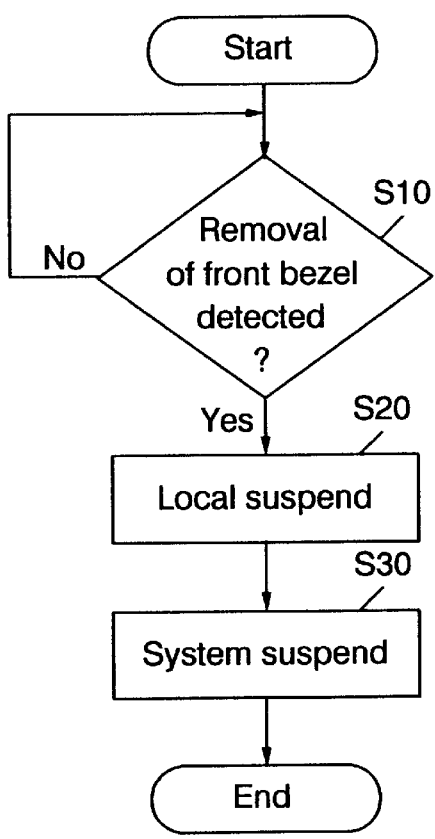
FIG. 6 is a flowchart of the general processing routine for removing a front bezel from a PC main body.
Figure 7:
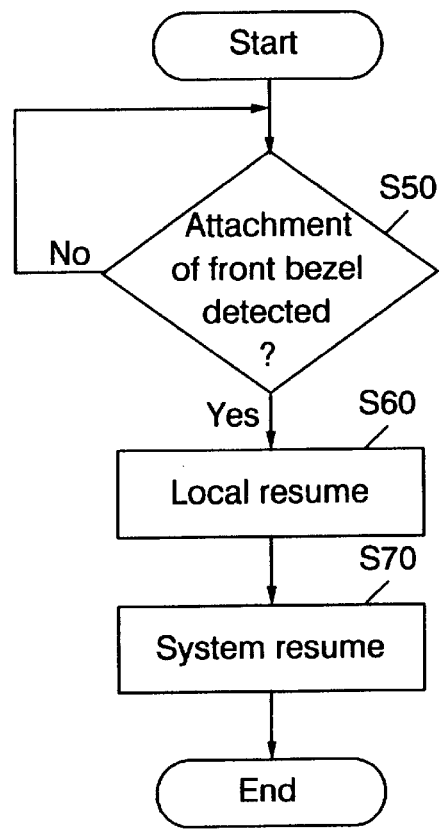
FIG. 7 is a flowchart of the general processing routine for reattaching the front bezel to the PC main body (including cable connection).

FIG. 6 is a flowchart for a processing routine for the removal of the front bezel 1B from the main body 1A. FIG. 7 is a flowchart for a processing routine for the attachment of the front bezel 1B to the PC main body 1A (including a cable connection).

When the detector 65A detects the removal of the front bezel 1B (S10), the local suspend operation is performed (S20), and the system suspend operation is also pararelly performed (S30). When the detector 65A detects the attachment of the front bezel 1B (S50), the local resume operation is performed (S60), and the system resume operation is also performed (S70).

Figure 8:
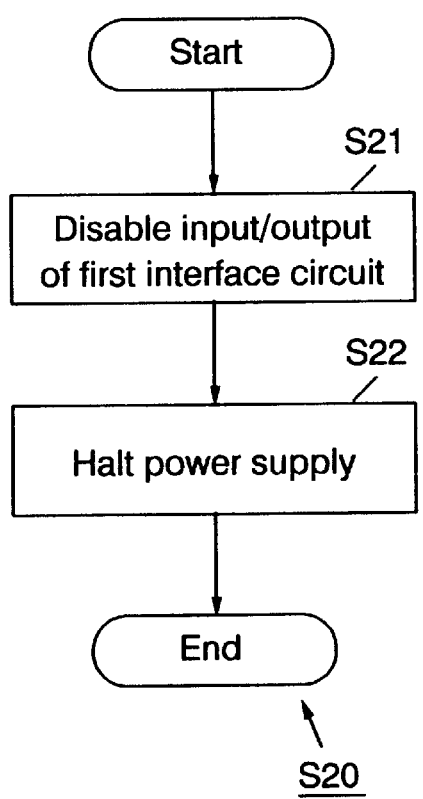
FIG. 8 is a flowchart of a local suspend processing routine.

FIG. 8 is a detailed flowchart for the routine for the performance of the local suspend process (step S20).

When the detector 65A detects the removal of the front bezel 1B, first, the input/output buffers 63A and 63B in the first interface circuit 63 are disabled in accordance with a signal carried across the signal line 65F, i.e., the buffers 63A and 63B are set to the tri-state OFF condition. In addition, a suspend interrupt is issued to the CPU 11 across the signal line 65G (step S21). Upon receipt of the suspend interrupt, the CPU 11 executes a predetermined system suspend routine. The processed application is halted by the system suspend routine, for which a detailed explanation will be given later while referring to FIG. 10.

When a certain delay period (several tens or several hundreds of mil seconds) has expired after the input/output buffers 63A and 63B were disabled, the detector 65A emits a signal across the signal line 65H to turn off the FET switch 57, and halts the power supply to the front bezel 1B (step S22). The predetermined delay period is a period that is taken to ensure that the disabled condition of the buffers 63A and 63B is stabilized.

Through the above described local suspend routine, the input/output buffers 63A and 63B are disabled immediately. As a result, the output of the video signals 71 to the LCD 21 and the disorderly open state of the tablet output signal line 72 and the power line 73 are avoided, and the deterioration of the hardware and the hanging-up of the devices can be appropriately prevented.

Figure 9:
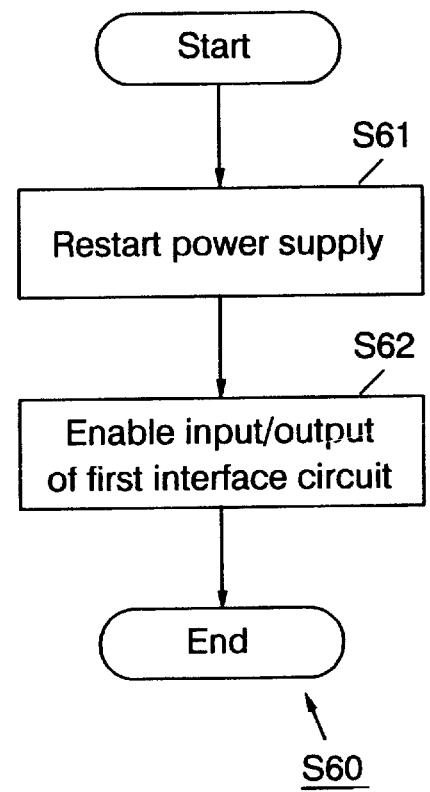
FIG. 9 is a flowchart of a local resume processing routine.
Figure 12:
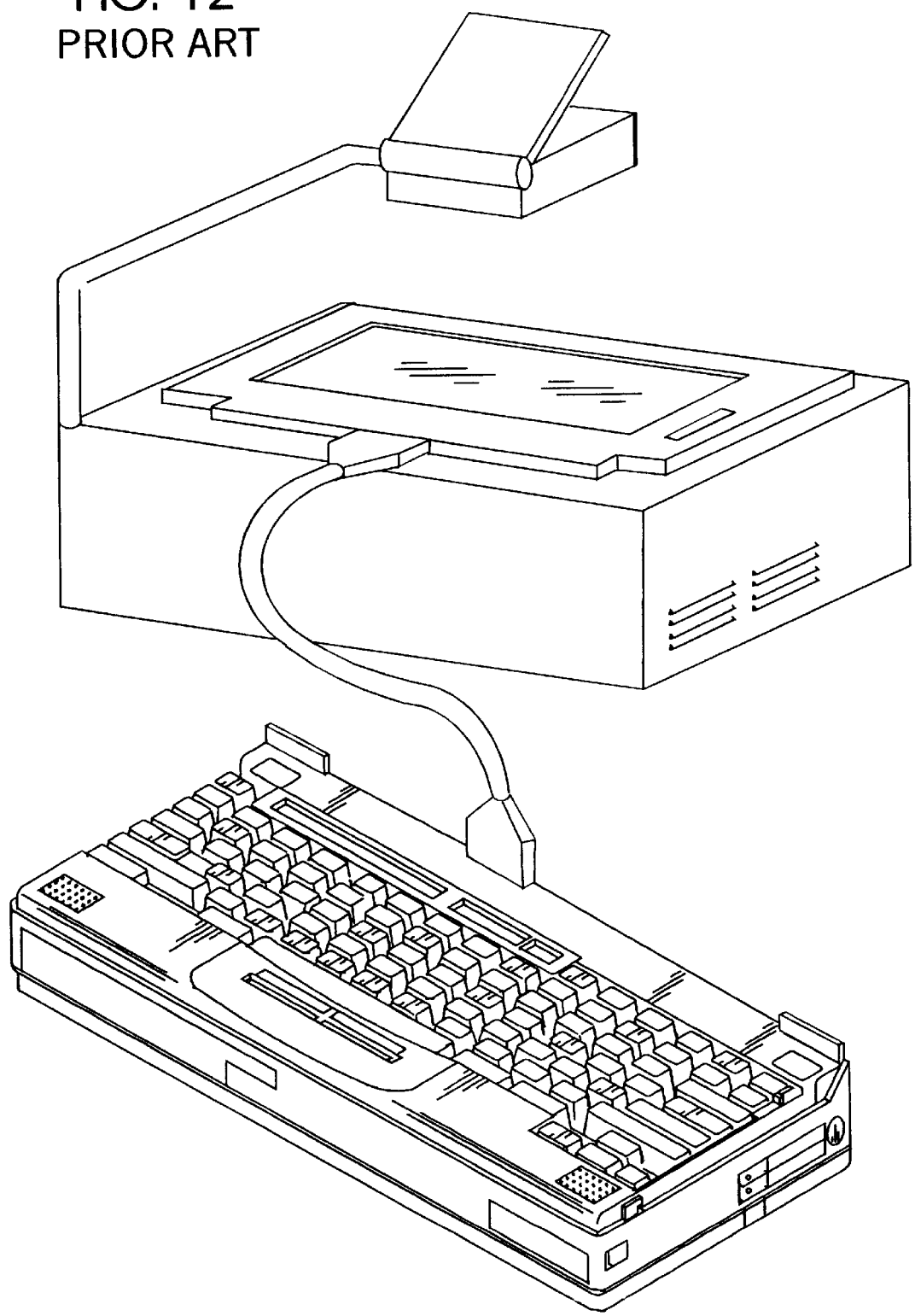
FIG. 12 is a diagram illustrating the state wherein the liquid crystal display panel of the notebook computer is employed with an OHP.

FIG. 9 is a detailed flowchart for the routine employed for the local resume process (step S60).

When the detector 65A detects the attachment of the front bezel 1B (or its connection by cable), the detector 65A emits a signal across the signal line 65H to turn on the FET switch 57 and resume the power supply to the front bezel 1B, and issues a resume interrupt to the CPU 11 across the signal line 65G (step S61). Upon receipt of the resume interrupt, the CPU 11 executes a predetermined resume routine. Since through the system resume process the halted application is resumed substantially at the same point at which it was frozen, and a screen display is also recovered, a user can smoothly restart his/her job. The system resume process will be described in detail later while referring to FIG. 10.

When a certain delay period (several tens or several hundreds of milliseconds) has expired after the power supply to the front bezel 1B began, the detector 65A emits a signal across the signal line 65F to enable the input/output buffers 63A and 63B in the first interface circuit 63, i.e., the buffers 63A and 63B are set to the tri-state ON condition (step S62). The certain delay period is a period that is taken to ensure that a supplied voltage is stabilized.

Figure 10:
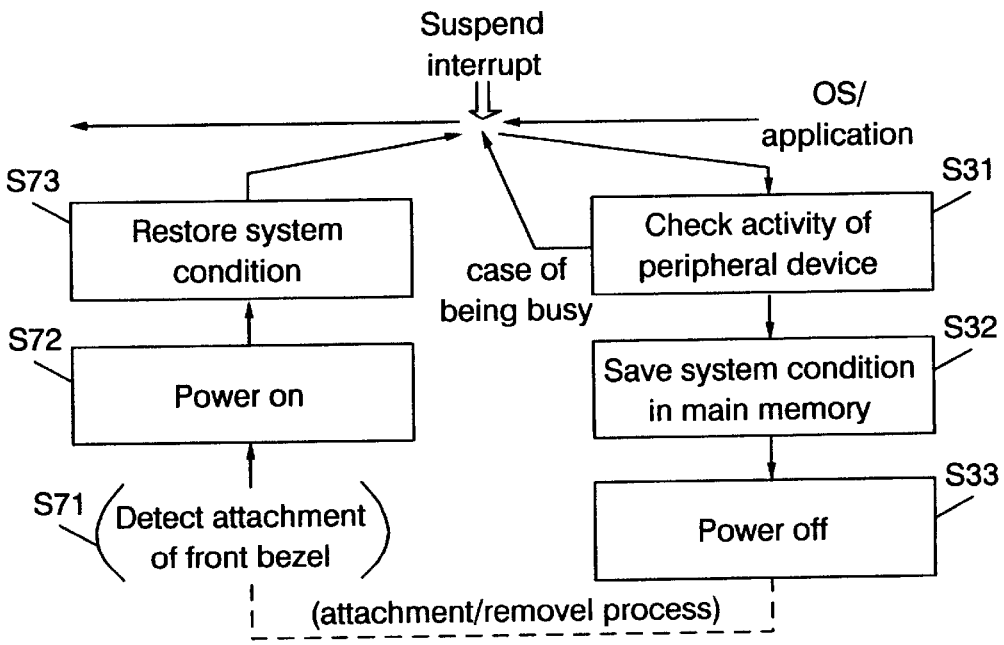
FIG. 10 is a detailed flowchart of a routine for entering to the system suspend mode (step S30) and a routine for recovering from the system suspend mode (step S70).

FIG. 10 is a detailed flowchart of a routine (step S30) for entering to the system suspend mode, and a routine (step S70) for recovering from the system suspend mode.

When the detector 65A has detected the removal of the front bezel 1B and has issued a suspend interrupt, the right of system control is shifted from a currently executing OS/application to the interrupt handler. The interrupt handler examines the respective peripheral devices for current activities (step S31). When an current activity is found, e.g., when a DMA transfer is being performed, the interrupt handler repeats the above activity examination upon the expiration of a predetermined time interval, for example, 10 msec. Program control waits until no activity is detected.

In a predetermined area in the main memory 14, the interrupt handler saves the system condition required for resuming the execution of a currently executing application (step S32). The system condition includes the register values of various chips, such as the CPU 11, the interrupt controller, the DMA controller and the video controller 20, a timer count value, and the contents of the VRAM 23.

When the system condition has been saved, the interrupt handler halts the power supply to all sections except the main memory 14 (step S33), and the apparatus is thereby entered into the system suspend mode (step S33). To halt the power supply, the interrupt handler sends an instruction to the power controller 28, which in turn re-writes the contents of the bit cells of the power management register 50.

After the power supply is halted, the reattachment, or the connection by cable, of the front bezel 1B is performed. When the detector 65A detects the attachment of the front bezel 1B, it issues a resume interrupt to the CPU 11 (step S71).

In response to the resume interrupt, the interrupt handler that is given the system control right restarts the power supply to the respective sections (step S72). To restart the power supply, the interrupt handler sends an instruction to the power controller 28, which in turn refreshes the contents of the bit cells of the power management register 50.

The system condition saved in the predetermined area in the main memory 14 is restored to recover the state existing immediately before the application was halted (step S73).

The right of system control is shifted to the application, and thereafter the system resume routine is completed. Since with this routine the halted application is resumed substantially at the same point at which it was frozen and a screen display is recovered, a user can smoothly resume his/her interrupted job.

That is, in this embodiment, the local suspend/resume function and the system suspend/resume function are performed in parallel. It should be fully noted that the purpose for adopting such suspend/resume functions is as follows.

(1) The system suspend/resume function is performed so that the screen display and a processed application is frozen during the detachment of the liquid crystal display panel/input tablet, and so that, when the display panel/input tablet is reattached, the display and the halted application is smoothly resumed at substantially the same point at which is was frozen.

(2) However, since the system suspend/resume function is associated with the saving/recovery of data, it may take several hundreds of milliseconds to several seconds from the start of the suspend function process to its completion, and may not provide a fast enough response for a rapid removal. Therefore, the local suspend/resume function is performed that can be locally and rapidly completed by only setting the output buffers to the tri-state ON/OFF condition, so that support for the rapid removal of the panel is ensured and the deterioration of hardware is prevented.

The present invention has been described in detail while referring to a specific embodiment. However, it should be obvious to one having ordinary skill in the art that various modifications or revisions of the embodiment are possible within the scope of the present invention. The present invention can be applied to electric/electronic apparatuses, such as facsimile machines, electronic notebooks and word processors, that include a liquid crystal display panel or an input tablet. That is, although the present invention has been disclosed by using an example, it should not be limited to that example. To fully understand the scope of the present invention, the claims should be referred to.

As is described above in detail, according to the present invention, provided is a superior portable information processing apparatus that comprises a main body for accommodating primary controllers and media; and a display unit having an internally mounted liquid crystal display panel/input tablet.

According to the present invention, provided is a superior portable information processing apparatus, having a detachable liquid crystal display panel/input tablet, whereof the liquid crystal display panel/input tablet can be detached from the apparatus even when the main body is powered on, i.e., is being operated.

According to the present invention, provided is a superior portable information processing apparatus, having a detachable liquid crystal display panel/input tablet, whereof a liquid crystal display panel can be detached from/attached to the apparatus while a program is being executed by the main body, and a user does not lose the program that was being executed during the detachment/attachment process.

That which is claimed:

1. A portable information processing apparatus, that includes a main body for accommodating primary electric parts and a power source, and a display panel for displaying process data, comprising:

(a) support means for detachably supporting the display panel;

(b) a video controller, accommodated in the main body, for outputting video signals to control a display on the display panel;

(c) a first interface circuit, provided on the main body, for sending the video signals to the display panel;

(d) a second interface circuit, provided on the display panel, for receiving the video signals from the main body;

(e) a power line along which the power source supplies power to the display panel;

(f) first and second connectors for disconnecting/connecting the first and second interface circuits;

(g) detection means for detecting mechanical attachment of the display panel from the support means;

(h) power supply means for, upon the detection performed by the detection means, starting to supply power from the power source to the display panel;

(i) enabling means for, after the power supply means has begun to supply power, enabling output of the video signals by the video controller across the first interface circuit only after expiration of a specified delay period in order to ensure that the video controller has stabilized.

2. The portable information processing apparatus as defined in claim 1, further including operation restart means for, upon a detection performed by the detection means, restoring for the apparatus an operating condition that has been saved and for resuming operation of the apparatus under the operating condition that is restored.

3. The portable information processing apparatus as defined in claim 1 further including a cable for connecting the first connector with the second connector, and wherein the detection means detects that the first connector is connected with the second connector directly or via the cable.

4. The portable information processing apparatus as defined in claim 3, further including operation restart means for, upon a detection performed by the detection means, restoring for the apparatus an operating condition that has been saved and for resuming operation of the apparatus under the restored operating condition.

5. A portable information processing apparatus, that includes a main body for accommodating primary electric parts and a power source, and a display panel for displaying processed data, comprising:

(a) support means for detachably supporting the display panel;

(b) a video controller, accommodated in the main body, for outputting video signals that control displayed contents on the display panel;

(c) a first interface circuit, provided on the main body, for sending the video signals to the display panel;

(d) a second interface circuit, provided on the display panel, for receiving the video signals from the main body;

(e) a power line along which power source supplies power to the display panel;

(f) first and second connectors for disconnecting/connecting the first and the second interface circuits;

(g) detection means for detecting mechanical removal of the display panel from, or attachment of the display panel to, the support means;

(h) interface control means for, upon detection performed by the detection means, disabling output of video signals from the video controller across the first interface circuit in response to mechanical removal of the display panel from the support means and for enabling output of video signals from the video controller across the first interface circuit in response to mechanical attachment of the display panel to the support means;

(i) power control means for halting/restarting supply of power by the power source to the display panel; and (j) operation halting/resumption means for, upon an occurrence of a predetermined event, saving/restoring for the apparatus an operating condition and for halting/resuming operation of the apparatus under the restored condition, (A) wherein the interface control means disables output of the first interface circuit upon the removal detected by the detection means, and enables output at the first interface circuit in response to the power control means restarting the power supply to the display panel, (B) wherein the power control means halts the power supply to the display panel when the interface control means disables first interface circuit, and restarts the power supply to the display panel upon the attachment detected by the detection means, and (C) wherein the operation halting/restarting means halts all operations by the apparatus and the video controller upon a detection by the detection means of removal, and restarts all operations by the apparatus and the video controller upon a detection means of the attachment.

* * * * *